T. A. WESTON.
Friction-Clutches.
No. 157,660.
Patented Dec. 8, 1874.
FIG. 1
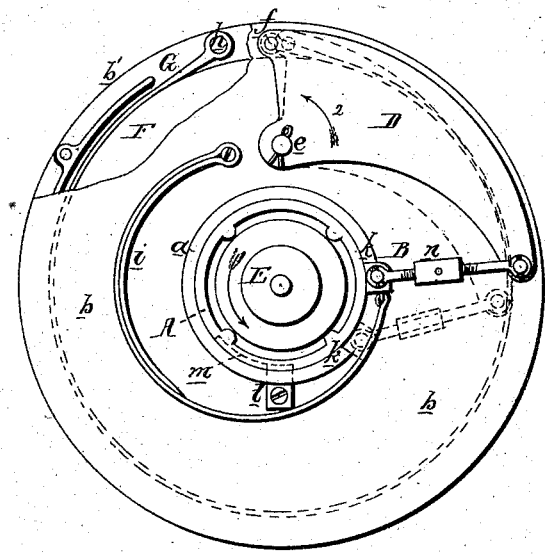
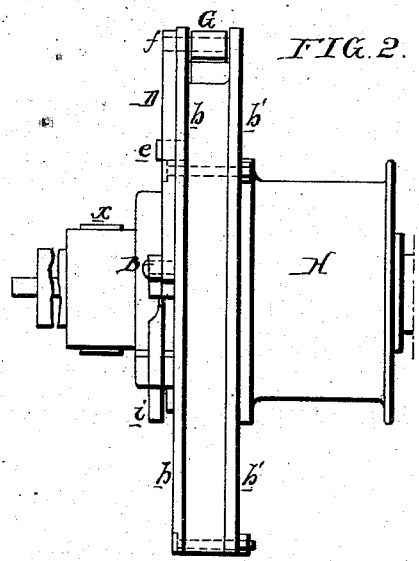
FIG. 2.
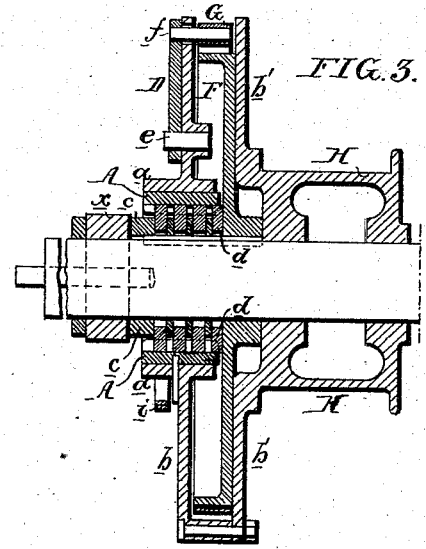
FIG. 3.
Witnesses, Hubert Howson
Thomas McIlvain
T. A. Weston
by his Attys.
Howson and Son

UNITED STATES PATENT OFFICE.

THOMAS A. WESTON, OF PHILADELPHIA, PENNSYLVANIA, ASSIGNOR TO HIMSELF AND JOHN HEINS, OF SAME PLACE.

IMPROVEMENT IN FRICTION-CLUTCHES.

Specification forming part of Letters Patent No. 157,660, dated December 8, 1874; application filed September 3, 1874.

CASE A.

*To all whom it may concern:*

Be it known that I, THOMAS A. WESTON, of Philadelphia, Pennsylvania, have invented an Improved Brake-Clutch, of which the following is a specification:

The object of my invention is to clutch a hoisting-drum, or other elevator or driver, to and disconnect it from a shaft; and this object I accomplish by so combining a sleeve or cylinder, A, a connecting-rod, B, and a bell-crank lever, D, that when the said cylinder is locked to, and caused to turn with, the shaft E and friction-wheel F, the lever shall, through the medium of the connecting-rod, be so operated as to contract the friction-band G upon the periphery of the friction-wheel, and to thus clutch the hoisting-drum H to the shaft, all as shown in the face view, Figure 1, and exterior and sectional elevations, Figs. 2 and 3, of the accompanying drawing.

The friction-wheel F is secured to the shaft, and is contained within a box-like extension of the hoisting-drum H, hung loosely to the shaft, but arranged to be clutched thereto by the devices which I will now proceed to describe.

A is a sleeve or cylinder, adapted to the interior of the hub $a$ of the cap-plate $b$ of the hoisting-drum, and has a limited rotary movement therein, and is arranged to be clutched to or disconnected from the shaft by an arrangement of friction-disks, $c$ and $d$, such as is shown in my patent of March 3, 1868, or by any other friction device. This cylinder A is connected by a rod, B, to a bell-crank lever, D, having its fulcrum at $e$ on the cap-plate $b$ of the hoisting-drum, and is attached at $f$ to one end of the friction-band G, which surrounds the friction-wheel F, and is connected at its opposite end $h$ to the rim $b'$ of the hoisting-drum.

So long as the cylinder A is disconnected from the shaft the several parts will be maintained in the position indicated by dotted lines in Fig. 1 by the action of a spring, $i$, attached to the cap-plate $b$, and to the connecting-rod or cylinder, the friction-band being then expanded and the hoisting-drum disconnected from the shaft. By simply pressing the disks $c$ and $d$ together, however, by means of a slide, $a$, on the shaft, the cylinder A will be locked to and caused to turn with the latter, in the direction indicated by the arrow, to the position shown by full lines in Fig. 1; this movement of the cylinder causing the bell-crank lever, through the medium of the connecting-rod, to be turned upon its fulcrum in the direction of the arrow 2, to a sufficient extent to contract the friction-band G upon the periphery of the friction-wheel, and to thus clutch the hoisting-drum to the shaft.

On drawing back the slide $a$ the disks $c$ and $d$ will be separated and the cylinder A released, and the parts will be restored to their original positions and the drum disconnected from the shaft by the recoil of the spring $i$.

The hub $a$ of the cap-plate is cut away or slotted to a sufficient extent to permit the required independent movement of the cylinder A and its connecting-rod, this movement being restricted by stops $k\ k$ at the opposite ends of the slot.

The cylinder is retained in its proper position within the hub by a key, $l$, adapted to a slot, $m$, in the said cylinder. The connecting-rod B is made in two sections, having right and left handed screw-threads, to which is adapted a coupling-nut, $n$, so that by turning the latter the said rod may be lengthened or shortened, and the extent of the movement of the lever thus regulated.

I prefer to use the arrangement of friction-disks $c$ and $d$ as a means of connecting the cylinder A to and disconnecting it from the shaft; but other friction devices may be used for this purpose.

My invention can be used for clutching chain-wheels, pulleys, or other elevators or drivers to shafts, and for disconnecting them therefrom, as well as for hoisting-drums.

I claim as my invention—

1. In a clutch-brake, the combination of a friction-wheel and friction-band with a sleeve or cylinder, A, connecting-rod B, and lever D, through the medium of which the said band is controlled, substantially as herein described.

2. The combination of the cylinder A, rod B, lever D, friction wheel and band, the loose drum or pulley H, the shaft E, and a friction device for connecting the cylinder A to and disconnecting it from the shaft.

In testimony whereof I have signed my name to this specification in the presence of two subscribing witnesses.

THOS. A. WESTON.

Witnesses:
E. H. BAILEY,
HARRY SMITH.